United States Patent [19]

Kwon et al.

[11] Patent Number: 5,238,867

[45] Date of Patent: Aug. 24, 1993

[54] METHOD FOR PREPARING AN OPTICAL SWITCHING DEVICE HAVING MULTIPLE QUANTUM WELLS

[75] Inventors: O'Dae Kwon; Seung-Won Lee, both of Kyungsangpuk, Rep. of Korea

[73] Assignee: Posco Educational Foundation, Kyungsangpuk, Rep. of Korea

[21] Appl. No.: 818,846

[22] Filed: Jan. 10, 1992

[30] Foreign Application Priority Data

Jul. 9, 1991 [KR] Rep. of Korea ............ 91-11793
Nov. 6, 1991 [KR] Rep. of Korea ............ 91-19638

[51] Int. Cl.[5] ........................................ H01L 21/20
[52] U.S. Cl. ........................... 437/110; 437/5; 437/128; 437/126; 148/DIG. 160
[58] Field of Search ............... 437/128, 110, 126; 148/DIG. 160

[56] References Cited

U.S. PATENT DOCUMENTS

| | | | |
|---|---|---|---|
| 4,525,687 | 6/1985 | Chemla et al. | 357/16 |
| 4,546,244 | 10/1985 | Miller | 250/211 J |
| 4,751,378 | 6/1988 | Hinton et al. | 250/213 A |
| 4,754,132 | 6/1988 | Hinton et al. | 250/213 A |
| 4,802,182 | 1/1989 | Thornton et al. | 372/46 |
| 4,885,260 | 12/1989 | Ban et al. | 437/82 |
| 4,937,835 | 6/1990 | Omura | 372/48 |
| 4,961,197 | 10/1990 | Tanaka et al. | 372/46 |
| 4,985,621 | 1/1991 | Aull et al. | 250/213 A |
| 5,001,522 | 3/1991 | Takahashi et al. | 357/17 |

Primary Examiner—Brian E. Hearn
Assistant Examiner—Trung Dang
Attorney, Agent, or Firm—Thomas J. Dodd

[57] ABSTRACT

Disclosed herein is a novel process for the manufacture of optical bistable switching device including multiple quantum wells. The process is carried out by: supplying a first organo-metallic compound as the source of a first metallic element and a reaction gas continuously while supplying a second organo-metallic compound as the source of a second metallic element in a discrete mode into a reactor and cultivating a semiconductor multiple quantum wells region having multiple pairs of intrinsic semiconductor-layer/semiconductor-layer(GaAs/Al-GaAs), one of the layer containing said second metallic element(Al), while controlling the mole fraction of said second metallic element(Al) to be in the range of 0.01 to 0.25 of the total first and second metal contents existing in the layer containing the second metallic element, thereby lowering the impurity concentration and optimizing the negative resistance.

5 Claims, 8 Drawing Sheets

METHOD FOR PREPARING AN OPTICAL SWITCHING DEVICE HAVING MULTIPLE QUANTUM WELLS

BACKGROUND OF THE INVENTION

This invention relates to an optical switching device including multiple quantum wells; and, in particular, to a self-electrooptic effect device having a multiple quantum wells region, a optical bistable switching device made thereof and a novel process for the manufacture thereof.

A wide range of recent research effects have achieved the development of semiconductor optical bistable switches capable of high speed switching, free space interconnection and simultaneous parallel processing of signals. These switches contain a semiconductor quantum wells region having an electric contact point as a self-electrooptic effect device. Operation of such optical switches is performed through a change in the light absorption characteristics in response to a change in applied electric field. This is mainly due to a quantum confined stark effect(QCSE) existing in a semiconductor quantum wells region.

The structure of multiple quantum wells made of, for example, multilayers of GaAs/AlGaAs and the above-mentioned QCSE phenomenon are described in an article by T. H. Wood et al., *High-speed Optical Modulation with GaAs/AlGaAs Quantum Wells in a p-i-n Diode Structure*, Appl. Phys. Le 44, 16(1984), and an article by David A. B. Miller et al., *The Quantum Well Self-Electrooptic Effect Device: Optoelectronic Bistability and Oscillation, and Self-Linearized Modulation*, IEEE J. of Quantum Electronics, QE-21, 1462(1985). The quantum wells disclosed in these articles are grown by the so-called molecular beam epitaxy (MBE) method, which has been used for the preparation of optical devices or microwave devices. The MBE technique is, however, inferior to a more recently developed method called metal organic vapor phase epitaxy(MOVPE) technique because the MBE process requires a higher level of vacuum and is of a lower production rate even though it has the advantage of easier control on the impurity concentration or composition ratio of a mixed crystal through a manipulation of certain parameters.

As the demand for optical switching devices is growing rapidly, various MOVPE techniques have been tried for very large scale production in the future. Self-electrooptic effect devices prepared by using the MOVPE method are disclosed in an article by M. Whitehead, et al., *Quantum Confined Stark Shifts in MOVPE-Grown GaAs-AlGaAs Multiple Quantum Wells*, Electronics Letters, 23, 1048 (1987), and also in an article by H. C. Lee, et al., IEEE J. of Quantum Electronics, 24, 1581(1988). The self-electrooptic devices disclosed in these articles show a similar QCSE as the devices prepared by using the MBE method, but fail to show a negative resistance, i.e., decrease in light absorption in response to the applied electric field, which is necessary for a self-electrooptic effect device to be useful as an optical switching device.

SUMMARY OF THE INVENTION

It is therefore an object of the present invention to provide a new and improved method for preparing optical switching devices having multiple quantum wells.

It is a further object of the invention to provide an improved method for preparing a self-electooptic device useful as an optical switching device by virtue of its negative resistance.

It is still another object of the instant invention to provide an improved process for the manufacture of optical switching devices by employing the MOVPE method at a reduced cost.

These objects of the present invention can be achieved by lowering the impurity concentration which is responsible for rendering the light absorption characteristics of the multiple quantum wells imperfect and by way of optimizing the negative resistance. These control mechanisms are carried out by: supplying a first organo-metallic compound as the source of a first metallic element and a reaction gas continuously while supplying a second organo-metallic compound as the source of a second metallic element in a discrete mode and controlled mode into a reactor and cultivating a semiconductor multiple quantum wells region having multiple pairs of intrinsic semiconductor-layer/semiconductor-layer, one of the layer containing said second metallic element, while controlling the mole fraction of said second metallic element to be in the range of 0.01 to 0.12 of the total first and second metal contents existing in the layer containing the second metallic element, thereby lowering the impurity concentration and optimizing the negative resistance.

In the method of the present invention, trimethyl gallium(TMGa) is preferably employed as the first organo-metallic compound; and trimethyl aluminum(TMAl) or triethyl aluminum(TEAl) is preferred as the second organo-metallic compound; while arsine (AsH3) may be preferably employed as the reaction gas.

BRIEF DESCRIPTION OF THE DRAWINGS

The above and other objects and features of the present invention will become apparent from the following descriptions given in conjunction with the accompanying drawings, wherein.

DETAILED DESCRIPTION OF THE PREFERRED EMBODIMENTS

Figure 1:
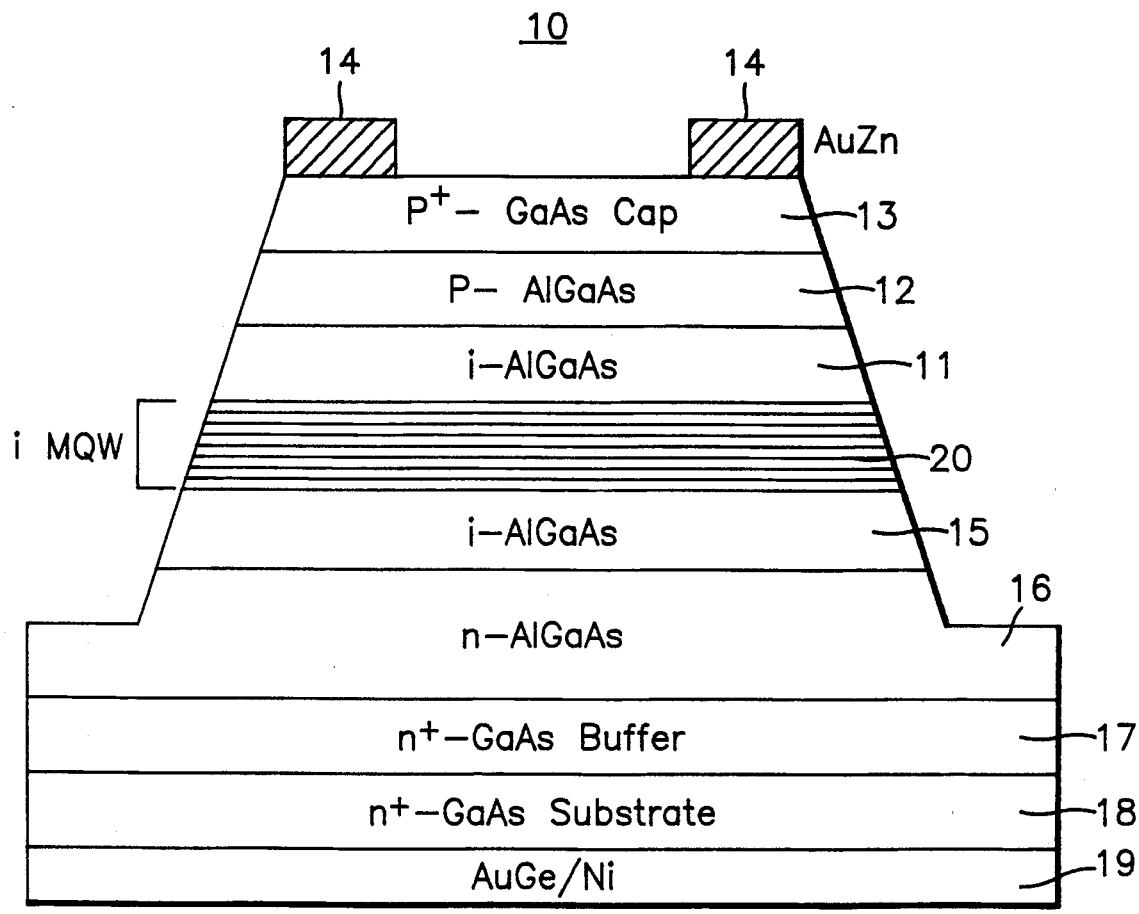
FIG. 1 illustrates the structure of an optical switching device having a multiple quantum well region grown by the MOVPE method.

FIG. 1 is a schematic diagram of the layer structure of an optical switching device prepared by the MOVPE method. The optical switching device 10 has a p-i-n structure which includes p-type layers 12, 13, an intrinsic multiple quantum wells(i-MQW) region 20 and an n-type layer 16. The optical switching device 10 also includes an n+-type buffer layer 17, an n-type semiconductor substrate 18 and intrinsic semiconductor layers 11, 15 which are used to protect the above mentioned i-MQW region 20.

In accordance with the present invention, the i-MQW region 20, which is the active region of the optical switching device, is generally made of, for example, fifty(50) pairs of gallium-arsenide layer/aluminum-gallium-arsenide layer, each layer with the thickness of approximately 100Å, grown alternatively for a period of, e.g., five(5) to ten(10) seconds for each layer.

The p-i-n layer structure of the optical switching device 10 is grown in a reactor, layer by layer, on the n-type substrate 18 by supplying the organo-metallic compounds and the reaction gas in accordance with the present invention by employing the MOVPE method. As previously stated, highly purified trimethyl gallium(TMGa) and trimethyl aluminum(TMAl) may be used as the organo-metallic compounds. Diethyl zinc(Zn(C2H5)2) is used as the zinc source for the p-type doping layers 12, 13. As the reaction gas, arsine(AsH3) diluted to about 10% concentration with purified hydrogen is used as the arsenic source. Silane(SiH4) is used as the silicon source for the n-type doping layers 16, 17. The temperature during the growth phase of these layers is controlled within a range between 700° C. and 750° C. The pressure within the reactor is kept at around 76 torr.

Except the i-MQW layer 20, in the two aluminum gallium arsenide(AlGaAs) layers 12 and 16, the mole fraction of the aluminum, i.e., the x value in AlxG1−xAs, is controlled to b 0.25 and, thereby, the absorption of light is reduced. The thickness of the cap layer 13 is controlled to be ultra thin, e.g., 300Å, so as to minimize the light absorption. The cap layer 13 is heavily doped to be of p+-type; and the metal electrode 14 is deposited thereon in order to reduce the contract resistance. The doping concentration in the p-type layer 12 and the n-type layer 16 is made to be, e.g., around $10^{18}$/cm$^3$; and that in the heavily doped p-type layer is made to be higher than $10^{18}$/cm$^3$.

In the past, the mole fraction of the aluminum in the AlxGa1−xAs barrier that separates the GaAs quantum wells within the i-MQW layer 20 was made to be around 0.3 regardless of whether the MOVPE method or the MBE method was used. In the case of MOVPE method, however, the use of TMAl entails an increased production of carbon impurities, which in turn raises the level of residual doping concentration, which then causes a disruption in the light absorption characteristics of the intrinsic multiple wells layer and also brings about the failure to satisfy the negative resistance requirement to be useful as an optical switching device.

In accordance with the present invention, the i-MQW layer 20 is made of fifty pairs of GaAs/AlxGa1−xAs layers and the value of x is controlled to lie in a range between 0.01 and 0.12, preferably between 0.01 and 0.08 and, more preferably, between 0.035 and 0.045; and the background doping concentration may be controlled to be lower than, e.g., $3 \times 10^{15}$/cm$^3$.

Figure 2:
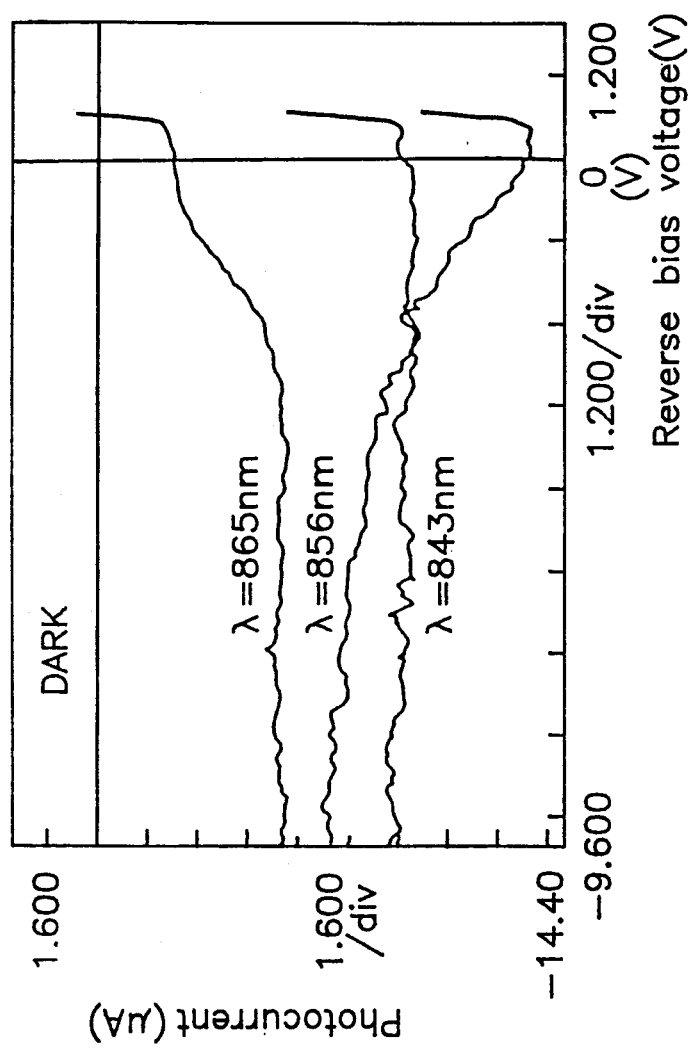
FIG. 2 shows the optical negative resistance(ONR) characteristics of the multiple quantum wells present in the optical switching device illustrated in FIG. 1.

FIG. 2 represents the optical negative resistance characteristics data obtained by measuring the photo responsively of an optical switching device having the multiple quantum wells and prepared in accordance with the present invention. As can be seen from the graph, the optical switching device prepared in accordance with the present invention clearly shows an optical negative resistance at the exciton absorption peak, $\lambda = 856$ nm, similar to the one exhibited by the device made by the MBE method as disclosed in the aforementioned article authored by Miller et al. Therefore, this demonstrates the remarkable result attained by the present invention which has remedied the defective negative resistance characteristics which used to be associated with devices produced by using the MOVPE method.

Figure 3:
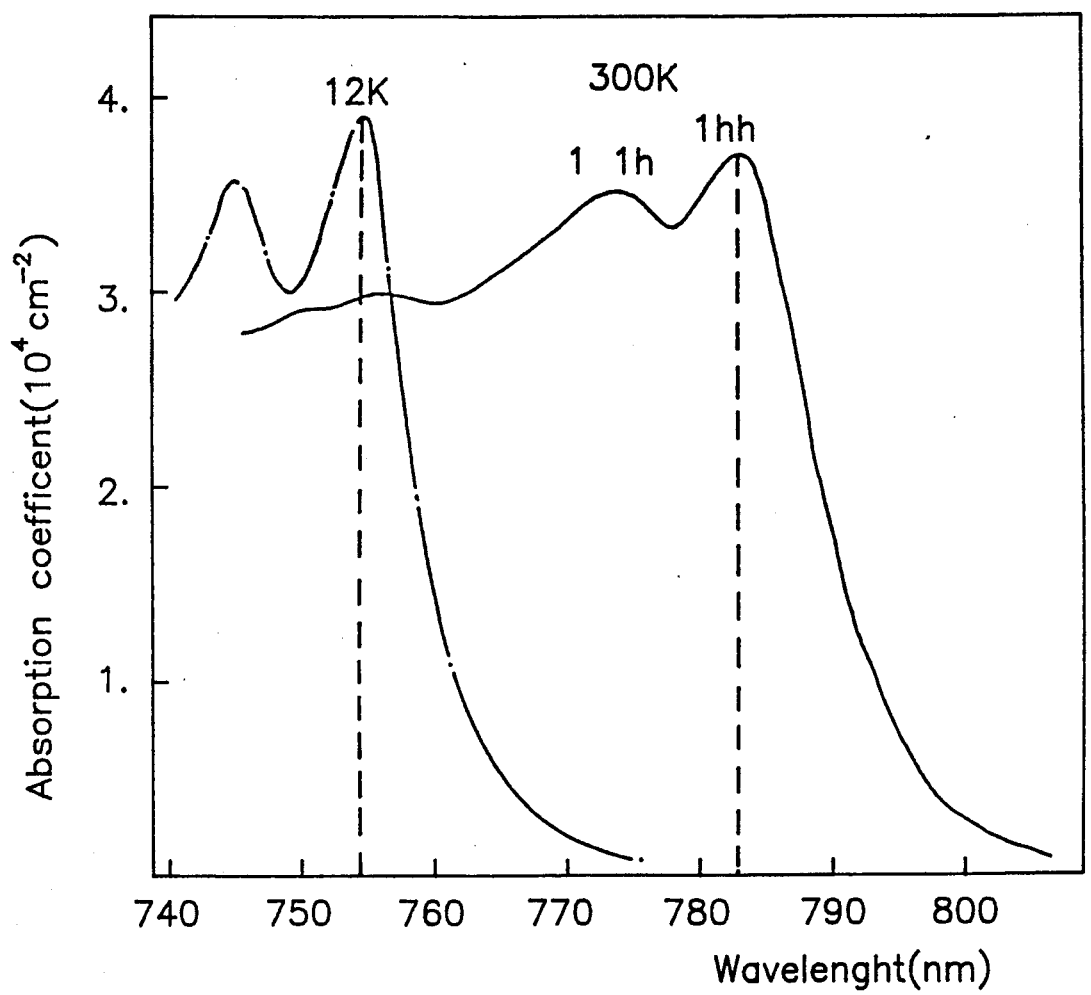
FIG. 3 describes the room temperature exciton characteristics and the QCSE of the optical switching device illustrated in FIG. 1.

FIG. 3 is a graph showing the optical absorption characteristics of the i-MQW layer samples with the x value of the AlxGa1−xAs layer being 0.3 at the room temperature(300° K.) and at the low temperature of 12 K. The diagram shows the existence of two exciton resonance peaks near the photo absorption edge at the room temperature of 300 K.: a heavy hole and a light hole. The peaks observed at the room temperature are wider than the two peaks measured at the low temperature, 12 K. This shows a similarity to the characteristics exhibited by the self-electrooptic effect device prepared by using the MBE method as disclosed in Phys. Rev. Lett. Vol., 53, 2173(1984).

The above-mentioned characteristics of the MQW devices prepared by the MOVPE method can be improved by way of narrowing the thickness of the AlGaAs barriers, as was tried for the MQW devices grown by the MBE method as disclosed by G. D. Boyd et al., 33 PS *Optical Switching of Symmetric Self-electrooptic Effect Devices*, Appl. Phys. Lett., 57, 1843(1990).

When the size of the devices needs to be reduced to than the order of hundreds or tens of microns, an insulating layer of silicon nitride (Si3N4), silicon oxide(SiO2) or polyimide can be inserted between the positive metal electrode 14 and the cap layer 13 (in FIG. 1). In this case, Cr/Au is preferably used as the metal electrode. When an optical window for transmission type device is necessary, the window can be made by selective etching at the GaAs substrate 18 through the buffer layer 17; and silicon nitride(Si3N4) can be deposited thereon as an anti-refection coating cap.

Figure 4A:
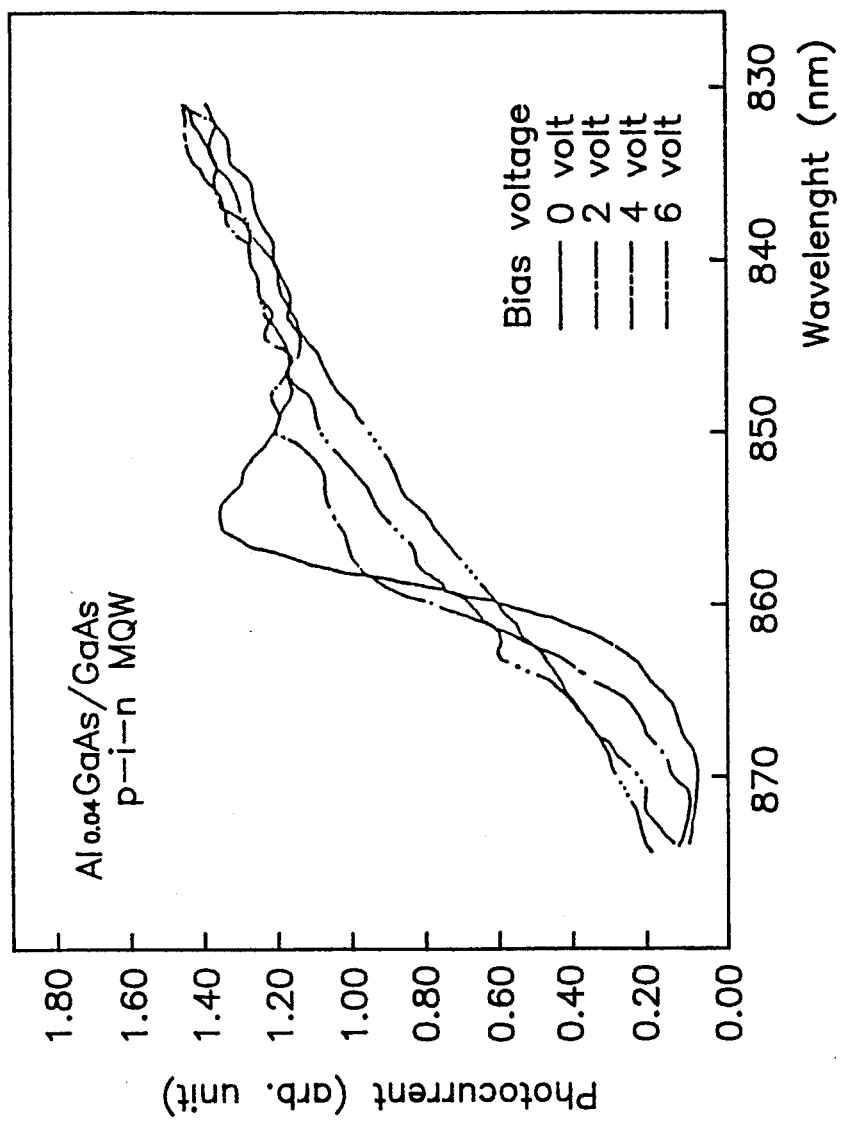
FIGS. 4a, 4b, 4c and 4d provide the photocurrent spectra of the optical switching devices made of seninconductor devices having different Al composition ratios in accordance with the present invention.
Figure 4B:
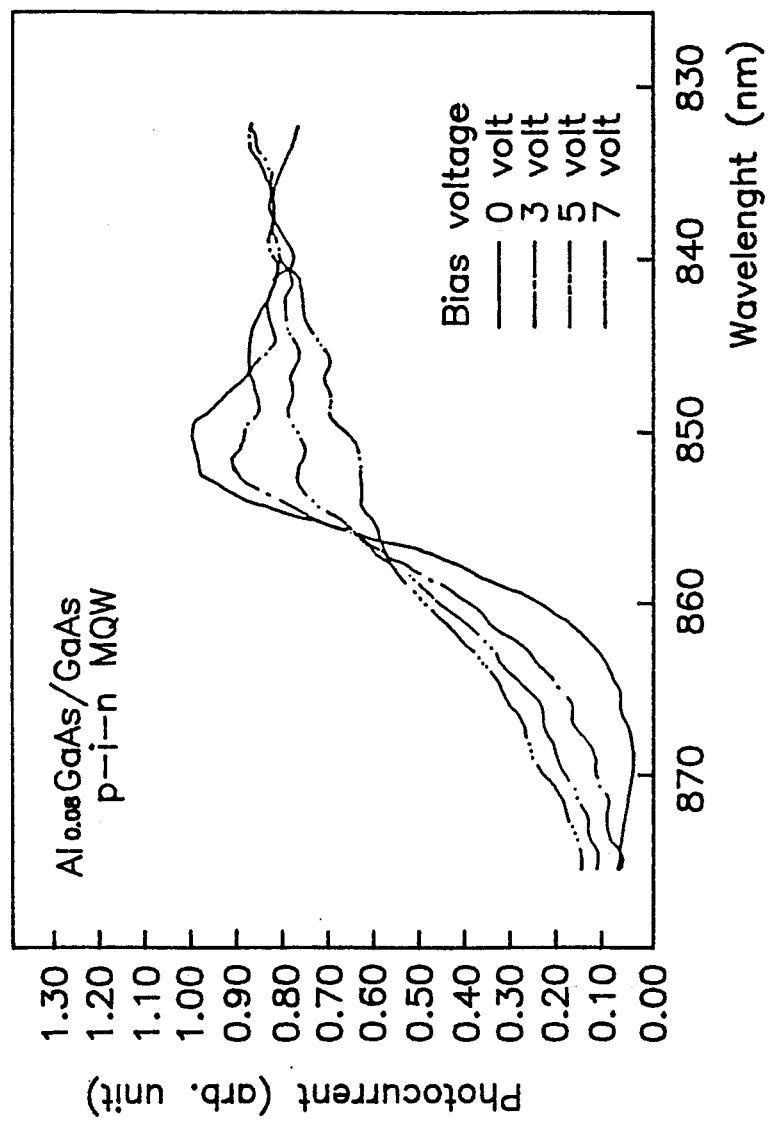
Figure 4C:
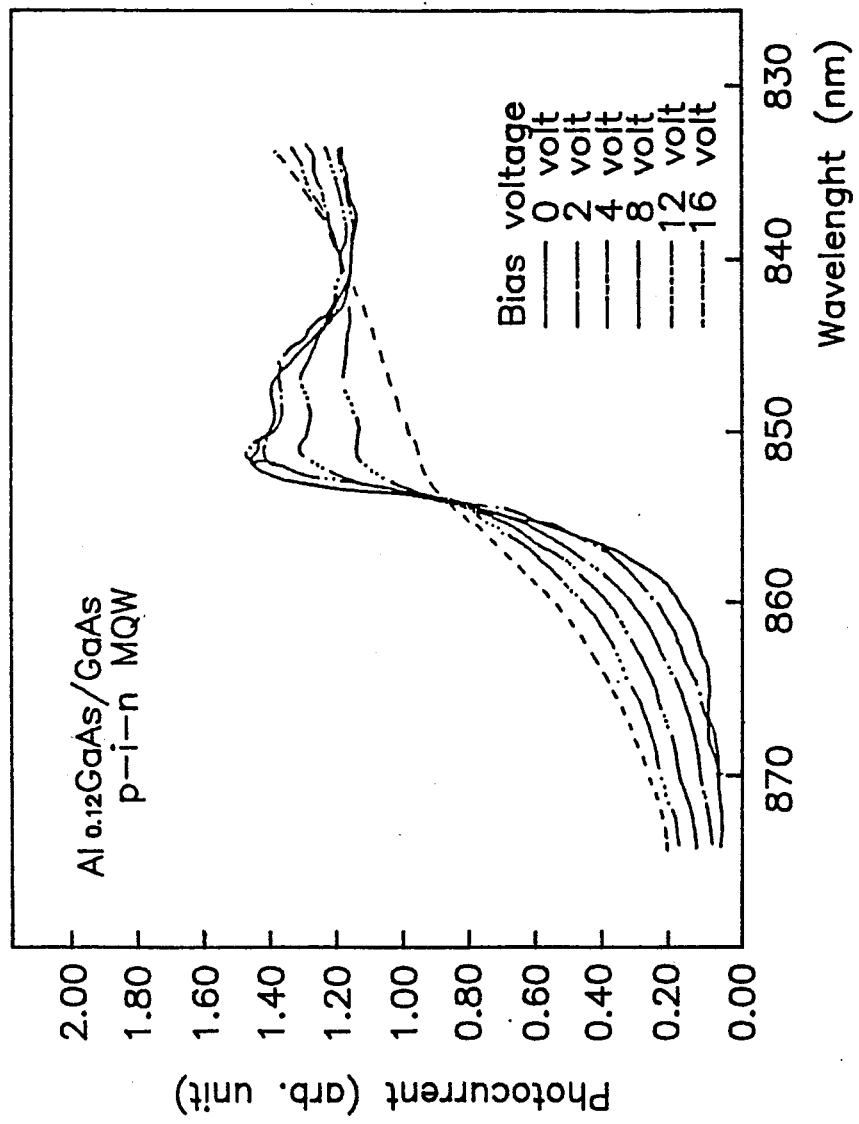
Figure 4D:
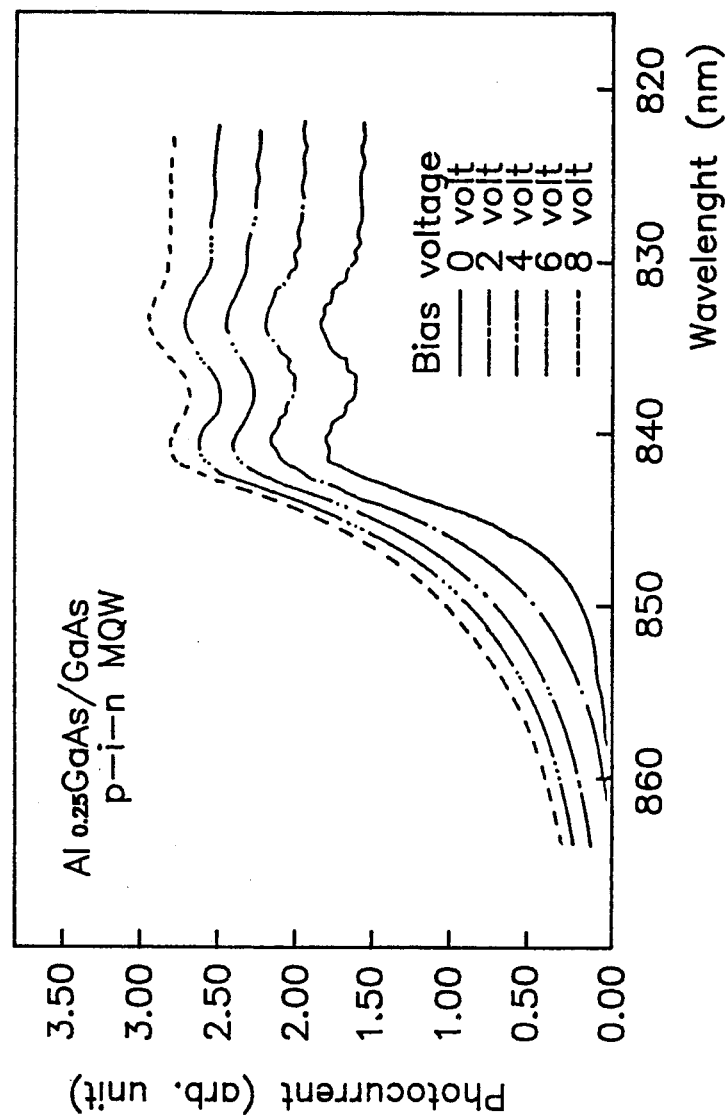

FIGS. 4a, 4b, 4c and 4d show the photocurrent spectra, subjected to various bias voltages from 0 to 16 volts, of p-i-n structure semiconductor optical switching devices having a low barrier i-MQW layer with the respective x value of 0.04, 0.08, 0.12 and 0.25 in the AlxGa1−xAs layer. From these graphs, it can be seen that, when the x value is very low, e.g., 0.04, the separation between the heavy hole and the light hole is narrowed and the two peaks degenerate into nearly one peak; and the switching operation occurs mainly due to the exciton quenching rather than the QCSE. In this case, as illustrated in FIG. 4a, by applying a 6 volt bias, the on-off ratio at 0 volt can be significantly increased. As shown in FIGS. 4b, 4c and 4d, the switching operation characteristics become deteriorated as the value of x in the AlxGa1−xAs layer increases. The on-off ratio can be improved if a reflection type optical switching device is used instead of a transmitting type switching device. For this purpose, an n-type GaAs/Al(Ga)As MQW reflection layer can be grown instead of the n-type buffer layer 17 shown in FIG. 1, as disclosed in the article of Appl. Phys. Lett., 50, 1119(1987).

Figure 5:
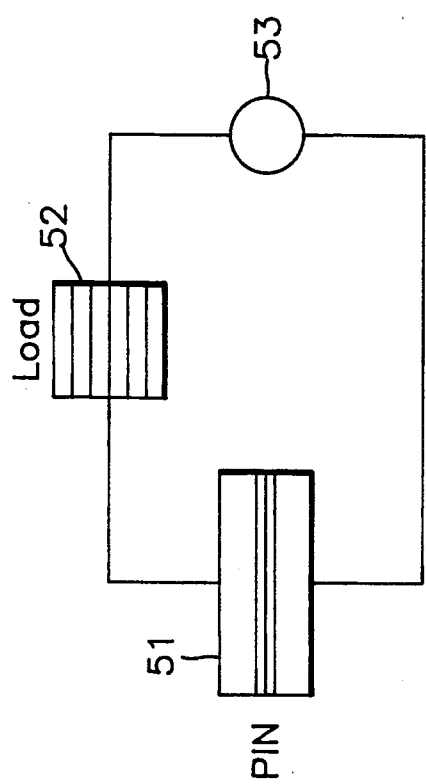
FIG. 5 offers an exemplary circuitry for the operation of the switching device illustrated in FIG. 1.

FIG. 5 is a schematic diagram illustrating a load circuitry useful to explain the operation of an optical switching device of the present invention.

The semiconductor optical switching device 51 is connected to the load 52 and an additional current source 53. The semiconductor optical switching device is reverse biased by the additional voltage source 53. The load 52 which provides bistability to the device 51 during an operation thereof may be of resistive load, constant current load or photo diode; and may also comprise a symmetrical semiconductor optical switching device (S-SOS) which employs a pair of the switching devices 51. The S-SOS offers a same flexibility to the bias condition as a symmetric self-electrooptic effect device does, as disclosed in U.S. Pat. No. 4,546,244 issued to Miller and in an article published in Appl. Phys. Lett., 52, 1419(1988). Specifically, the Miller patent discloses an optical switch array integrally provided on a single chip, which enables simultaneous parallel processing of signals in an n×m matix format; and, therefore, may find various applications such as in optical switching systems and optical computers which require parallel processing of signals in a massive scale and high speed. Such switch arrays may be manufactured more easily by the MOVPE method in accordance with the present invention, as can be readily understood by a person skilled in the art.

While the invention has been described with reference to its preferred embodiments, those skilled in the art will recognize that other and further modifications may be made thereto without departing from the spirit of the invention. For instance, semiconductor materials useful for the optical switching device of the invention are not limited to GAAs but may also include a ternary compounds e.g., InGaAs; quaternary compounds, e.g., InGaAsP or InGaAlAs; 3-5 Group compounds, e.g., InP; 4-4 Group compounds, e.g., SiGe; and 2-6 Group compounds. Similarly, materials useful for the MOVPE method are not limited to TMGa, TMAl, TEAl; and the reaction gas may further include other materials known to those skilled in the art.

What is claimed is:

1. A method for preparing an self-electrooptic effect device containing a semiconductor multiple quantum well region, which comprises: supplying a first organo-metallic compound as the source of a first metallic element and a reaction gas continuously into a reactor while supplying a second organo-metallic compound thereto as the source of a second metallic element in a discrete and controlled mode so as to form the semiconductor multiple quantum wells region having multiple pairs of intrinsic semiconductor layers, one of the layers containing the second metallic element, while controlling the mole fraction of the second metallic element to lie within a range between 0.01 and 0.12 of the total first and second metal contents present in the layer containing the second metallic element.

2. The method of claim 1, wherein said first organo-metallic compound is trimethyl gallium, said reaction gas is arsine and said second organo-metallic compound is trimethyl or triethyl aluminum.

3. The method of claim 2, wherein said multiple quantum wells region comprises multiple pairs of intrinsic GaAs/AlGaAs layers.

4. The method of claim 3, wherein the mole fraction of said aluminum lies within a range between 0.01 and 0.08 of the total metal contents present in the AlGaAs layer.

5. The method of claim 4, wherein the mole fraction of said aluminum is within a range between 0.035 and 0.045.

* * * * *